No. 897,777. PATENTED SEPT. 1, 1908.
E. A. PFLUEGER.
DISPLAY CLOSURE.
APPLICATION FILED JUNE 24, 1907.
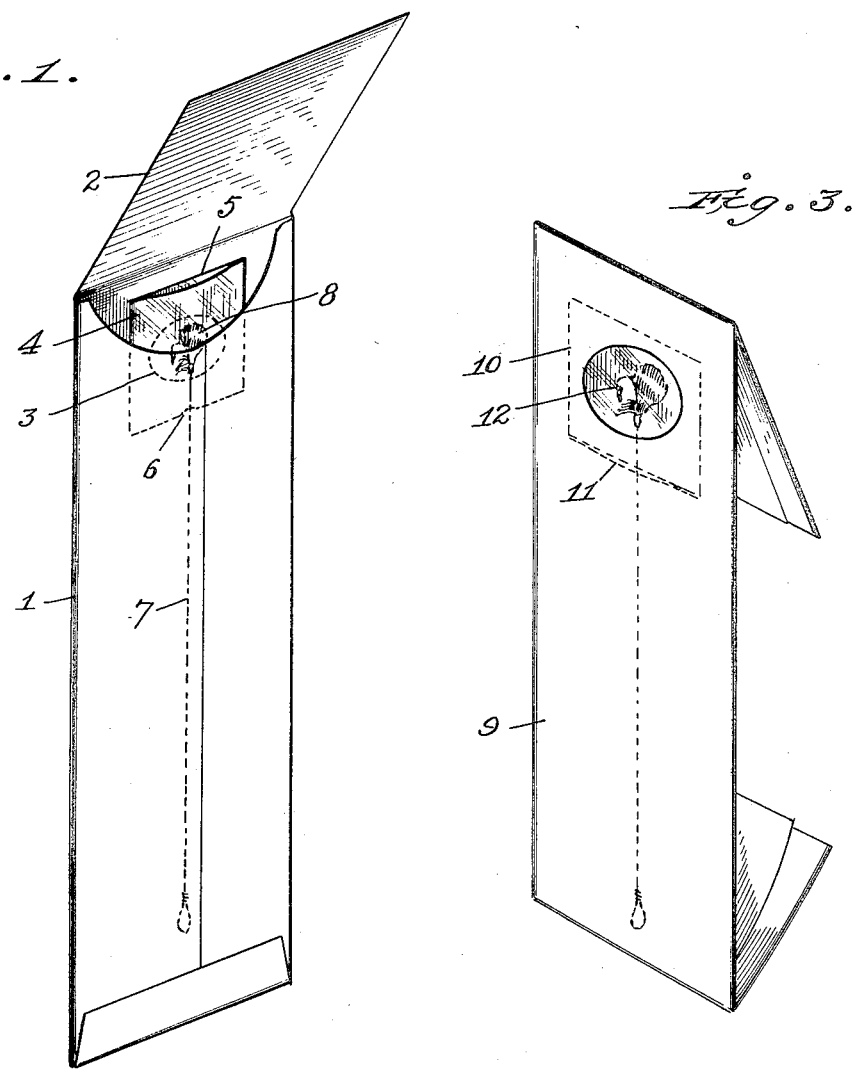
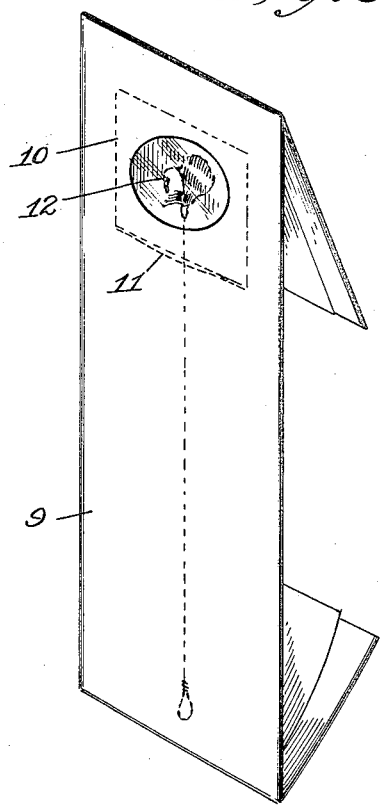
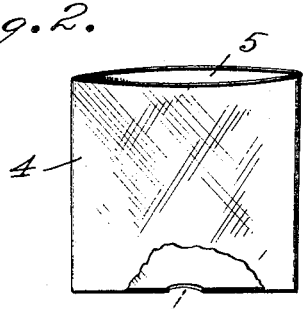
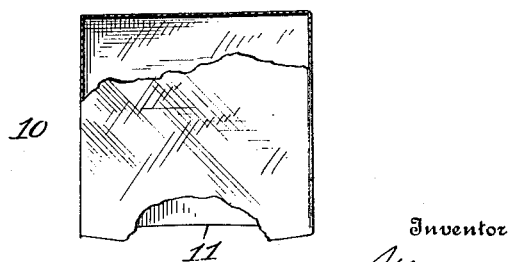
Witnesses
Edwin L. Yewell
Edwin T. Frey
Inventor
Ernest A. Pflueger
by Percy B. Hills
Attorney

UNITED STATES PATENT OFFICE.

ERNEST A. PFLUEGER, OF AKRON, OHIO, ASSIGNOR TO THE E. A. PFLUEGER COMPANY, OF AKRON, OHIO, A CORPORATION OF OHIO.

DISPLAY-CLOSURE.

No. 897,777.　　　　　Specification of Letters Patent.　　　Patented Sept. 1, 1908.

Application filed June 24, 1907. Serial No. 380,552.

*To all whom it may concern:*

Be it known that I, ERNEST A. PFLUEGER, a citizen of the United States, residing at Akron, in the county of Summit, State of Ohio, have invented new and useful Improvements in Display-Closures, of which the following is a specification.

My invention relates to display envelops and folders, more particularly designed for displaying fishing tackle, such as fly hooks, and has for its objects, first, to display the contents of the envelop or folder without opening the same; secondly, to display but one of the contained articles, thus protecting the others from the light; and, thirdly, to surely retain the article to be displayed in position where it may be seen. These objects I accomplish in the manner and by the means hereinafter described and claimed, reference being had to the accompanying drawing, in which:

Figure 1 is a perspective view of an envelop embodying my improved construction. Fig. 2 is an enlarged detail view of the transparent pocket for said envelop. Fig. 3 is a view similar to Fig. 1 of a folder embodying a somewhat modified construction. Fig. 4 is a view similar to Fig. 2 of the transparent pocket for said folder.

In the said drawing, referring more particularly to Figs. 1 and 2, the reference numeral 1 denotes an envelop or closure adapted particularly for the reception of fly hooks and their snells, the same having the usual closing flap 2. Said envelop is provided in its outer face near the flap end with an aperture 3 preferably of the shape shown, over which is pasted, on the inner side of the envelop, a pocket 4, formed of any suitable transparent material, said aperture 3 thus forming a display opening. Said pocket is open across its upper end at 5, and its lower edge is centrally apertured at 6.

When the envelop is to be filled with fly hooks of a certain common design, the snell 7 of one of them is passed into the open upper end of the pocket 4 and through the aperture 6 in the lower edge thereof until the fly hook 8 comes opposite the aperture 3 in the body of the envelop, as shown in Fig. 1. Said fly hook is thus positioned to be at all tines displayed through said aperture 3, whereby it may be inspected without opening the envelop. The rest of the fly hooks and snells may then be inserted, preferably hooks down in the envelop, where they will be protected from the fading effect of the light, and the envelop thus filled may be permanently displayed in a show case or window, the character of its contents being shown by the single fly hook displayed, while the rest are effectually protected.

In Figs. 3 and 4 I have shown a modified construction wherein a folder 9 is used instead of an envelop, and wherein the pocket 10 is closed at its upper end and is open at 11 at its lower end. In this construction, when the folder is open, a single fly hook 12 may be inserted into the pocket 10 through its lower open end 11 for display, and the rest of the contents laid in the folder, preferably, with their fly hooks at the lower end thereof. The article being then folded as shown, the single fly hook is exposed, while the others are protected. It will be observed that not only is there but a single fly hook exposed in each of these constructions, but also that said fly hook is accurately retained in position by the pocket it is placed in, directly behind the display opening.

The envelops and folders may be made of any suitable opaque material, such as paper, cloth, or leather, and the transparent pockets may also be made of any suitable transparent material.

It will be understood that the inner wall of the pocket need not be of transparent material, it being necessary only that such must be the character of its outer wall closing the aperture in the envelop or folder.

Having thus described my invention, what I claim as new and desire to secure by Letters Patent is:

A display closure, embodying a front having a display aperture therein, and a pocket formed of two walls united together and open at one end, and overlying and closing said aperture, said pocket being formed of transparent material on that face or wall closing said display aperture, and having its transparent face or wall united to said closure front.

In testimony whereof, I have hereunto set my hand in the presence of two subscribing witnesses.

ERNEST A. PFLUEGER.

Witnesses:
　JENNIE M. CARLSON,
　LLEWELLYN W. GRIFFITHS.